(12) United States Patent
Maier

(10) Patent No.: US 7,006,339 B2
(45) Date of Patent: Feb. 28, 2006

(54) APPARATUS FOR AND METHOD OF PROTECTING THE SAFE SIDE WIRING OF A PROTECTIVE BARRIER AGAINST TRANSFERRING FAULT ENERGY INTO A POTENTIALLY EXPLOSIVE ENVIRONMENT

(75) Inventor: Lawrence Carl Maier, New Haven, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 414 days.

(21) Appl. No.: 10/427,460

(22) Filed: May 1, 2003

(65) Prior Publication Data
US 2004/0218321 A1 Nov. 4, 2004

(51) Int. Cl.
H02H 3/22 (2006.01)

(52) U.S. Cl. ...................... 361/43; 174/35 R
(58) Field of Classification Search ............. 361/43; 174/35 R, 35 C
See application file for complete search history.

(56) References Cited

U.S. PATENT DOCUMENTS 3,178,503 A * 4/1965 Bell et al. ................. 174/11 R
4,705,915 A * 11/1987 Van Brunt et al. ......... 174/35 R
6,141,194 A * 10/2000 Maier ........................ 361/58
6,846,201 B1 * 1/2005 Lazaro, Jr. ................. 439/598

* cited by examiner

Primary Examiner—Brian Sircus
Assistant Examiner—Boris Benenson
(74) Attorney, Agent, or Firm—Peter Hernandez; Calfee, Halter & Griswold LLP

(57) ABSTRACT

A method of protecting safe side wiring of a protective energy barrier against transferring fault energy into a potentially explosive environment comprises the steps of: enclosing the safe side wiring with at least one layer of shielding completely along the length thereof, the at least one layer of shielding capable of conducting the fault energy; connecting the safe side wiring at one end to circuitry of the protective energy barrier through a first connector having a housing which completely surrounds the safe side wiring prior to entering the protective energy barrier and is capable of conducting the fault energy; connecting the at least one layer of shielding of the safe side wiring to the housing of the first connector to conduct fault energy therebetween; connecting the safe side wiring at another end to circuitry within the potentially explosive environment through a second connector having a housing which completely surrounds the safe side wiring prior to entering the potentially explosive environment and is capable of conducting the fault energy; connecting the at least one layer of shielding of the safe side wiring to the housing of the second connector to conduct fault energy therebetween; and connecting the housings of the first and second connectors to structures capable of dissipating the fault energy.

25 Claims, 4 Drawing Sheets

APPARATUS FOR AND METHOD OF PROTECTING THE SAFE SIDE WIRING OF A PROTECTIVE BARRIER AGAINST TRANSFERRING FAULT ENERGY INTO A POTENTIALLY EXPLOSIVE ENVIRONMENT

BACKGROUND OF THE INVENTION

The present invention is related to protective energy barriers for potentially explosive environments in general, and more particularly to apparatus for and method of protecting the safe side wiring of a protective energy barrier against transferring fault energy into a potentially explosive environment, like an aircraft fuel tank, for example.

Fuel quantity measuring systems (FQMS) are disposed on-board aircraft for determining and monitoring the amount of fuel remaining in an aircraft fuel tank utilizing one or more sensors located within the tank. A block diagram schematic of an exemplary FQMS 10 is shown in FIG. 1. Referring to FIG. 1, the FQMS 10 includes an indicator circuit 12, which is located typically in the cockpit of the aircraft, and a fuel tank 14 which contains one or more sensors (not shown), which may be of the capacitive variety, for example, for sensing the level of the fuel in the tank 14. The indicator circuit 12 typically includes processing circuits and a communication interface to transmit AC excitation signals to each sensor in the tank. Each sensor responds with a response signal, representative of the fuel level, which is fed back to the indicator circuit 12 wherein the response signal is processed to determine the quantity of fuel in the tank.

The sensors within the tank 14 are coupled to the indicator circuit 12 through a plurality of wires 16. In the present example, three wires 16 are used for the capacitive type sensors wherein two wires 16a and 16b are low impedance lines used to couple the excitation signals from the indicator circuit 12 to the sensors, and the third wire 16c is a high impedance line used to carry the response signals from the sensors back to the indicator circuit 12 in a time multiplexed fashion, for example. The high impedance line 16c is typically shielded to prevent capacitive coupling between the low impedance lines 16a and 16b and high impedance line 16c which could degrade the response signals.

It is well known that a potentially explosive environment like the aircraft fuel tank has to be protected from an excessive transfer of energy over the lines 16 which may result from a variety of potential system faults that may include power fault conditions and lightning strikes, for example, while not impacting the system performance. Generally, protective barrier circuitry 18 is provided in series with the lines 16 to limit the transfer of fault energy from threat side 20 to a safe side 22. The protective barrier 18 limits the fault energy to a level that is below the minimum ignition energy of an explosive mixture within the fuel tank 14. A typical protective barrier used for this purpose is disclosed in the U.S. Pat. No. 6,141,194, issued Oct. 31, 2000, entitled "Aircraft Fuel Tank Protective Barrier and Method", and assigned to the same assignee as the instant application, which patent being incorporated by reference herein for providing such a protective barrier in greater detail. In the present embodiment, the barrier circuitry 18 is grounded to the ground of the indicator circuit 12 on the unprotected or threat side 20 and grounded to the ground of the tank 14 on the protected or safe side 22. Both grounds are sufficient to carry the currents of any contemplated fault condition.

Since the protective barrier 18 is generally not located directly within a wall of the protected fuel tank 14, some type of wiring 24 is used to couple the excitation signals and response signal at the safe side 22 to the sensors within the fuel tank 14. Accordingly, unless the safe side wiring 24 is configured correctly, it may provide an entry point for unacceptable fault energy levels into the fuel tank regardless of the protective capabilities of the protective barrier 18.

The present invention includes apparatus for and method of configuring the safe side wiring of the protective barrier against unacceptable energy levels that may result from system fault conditions.

SUMMARY OF THE INVENTION

In accordance with one aspect of the present invention, a method of protecting safe side wiring of a protective energy barrier against transferring fault energy into a potentially explosive environment comprises the steps of: enclosing the safe side wiring with at least one layer of shielding completely along the length thereof, the at least one layer of shielding capable of conducting the fault energy; connecting the safe side wiring at one end to circuitry of the protective energy barrier through a first connector having a housing which completely surrounds the safe side wiring prior to entering the protective energy barrier and is capable of conducting the fault energy; connecting the at least one layer of shielding of the safe side wiring to the housing of the first connector to conduct fault energy therebetween; connecting the safe side wiring at another end to circuitry within the potentially explosive environment through a second connector having a housing which completely surrounds the safe side wiring prior to entering the potentially explosive environment and is capable of conducting the fault energy; connecting the at least one layer of shielding of the safe side wiring to the housing of the second connector to conduct fault energy therebetween; and connecting the housings of the first and second connectors to structures capable of dissipating the fault energy.

In accordance with another aspect of the present invention, apparatus for protecting safe side wiring of a protective energy barrier against transferring fault energy into a potentially explosive environment comprises: at least one layer of shielding enclosing the safe side wiring completely along the length thereof, the at least one layer of shielding capable of conducting the fault energy; a first connector for connecting the safe side wiring at one end to circuitry of the protective energy barrier, the first connector having a housing which completely surrounds the safe side wiring prior to entering the protective energy barrier and is capable of conducting the fault energy, the at least one layer of shielding being connected to the housing of the first connector for conducting fault energy therebetween; a first connection assembly for connecting the housing of the first connector to a first structure to conduct fault energy therebetween; a second connector for connecting the safe side wiring at another end to circuitry within the potentially explosive environment, the second connector having a housing which completely surrounds the safe side wiring prior to entering the potentially explosive environment and is capable of conducting the fault energy, the at least one layer of shielding being connected to the housing of the second connector for conducting fault energy therebetween; and a second connection assembly for connecting the housing of the second connector to a second structure to conduct fault energy therebetween.

DETAILED DESCRIPTION OF THE INVENTION

Figure 1:
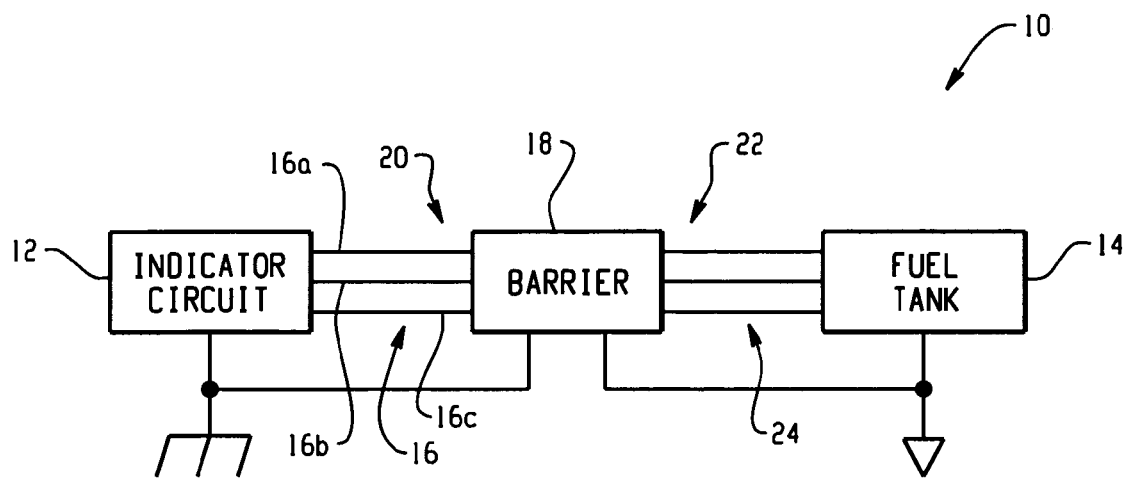
FIG. 1 is a block diagram schematic illustrating the use of a protective energy barrier in a fuel quantity monitoring system which is an exemplary environment for embodying the present invention.
Figure 3:
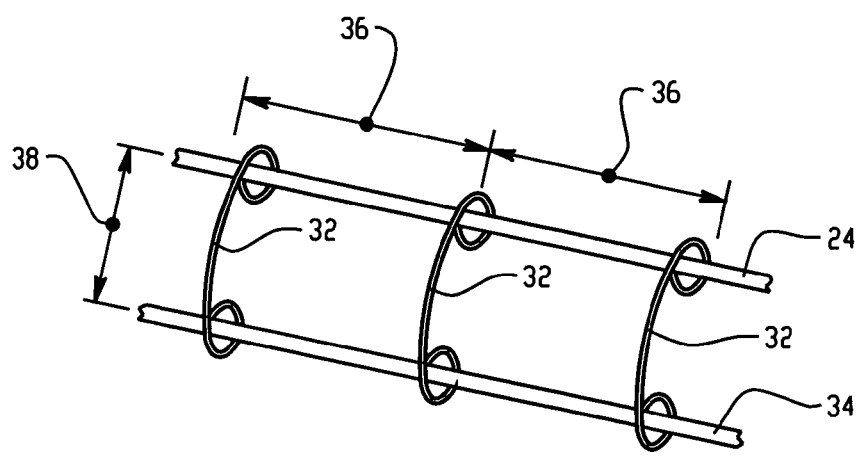
FIG. 3 is an illustration of an exemplary embodiment for maintaining separation of shielded safe side wiring from other cabling along the length thereof.
Figure 2:
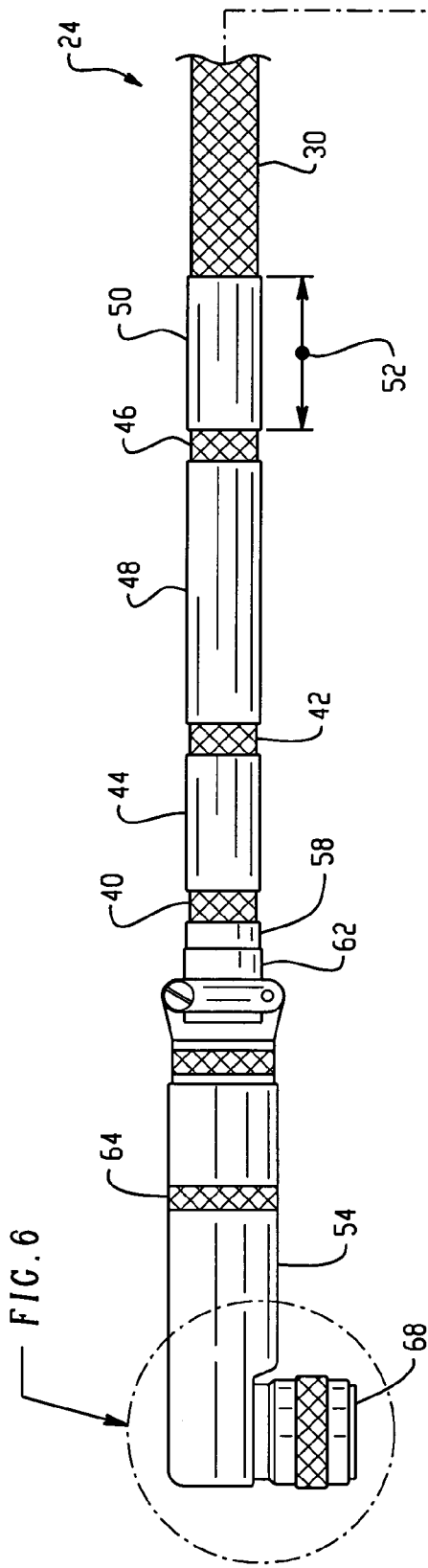
FIG. 2 is an illustration of an exemplary wiring configuration for the safe side wiring of a protective energy barrier suitable for embodying the broad principles of the present invention.
Figure 2:
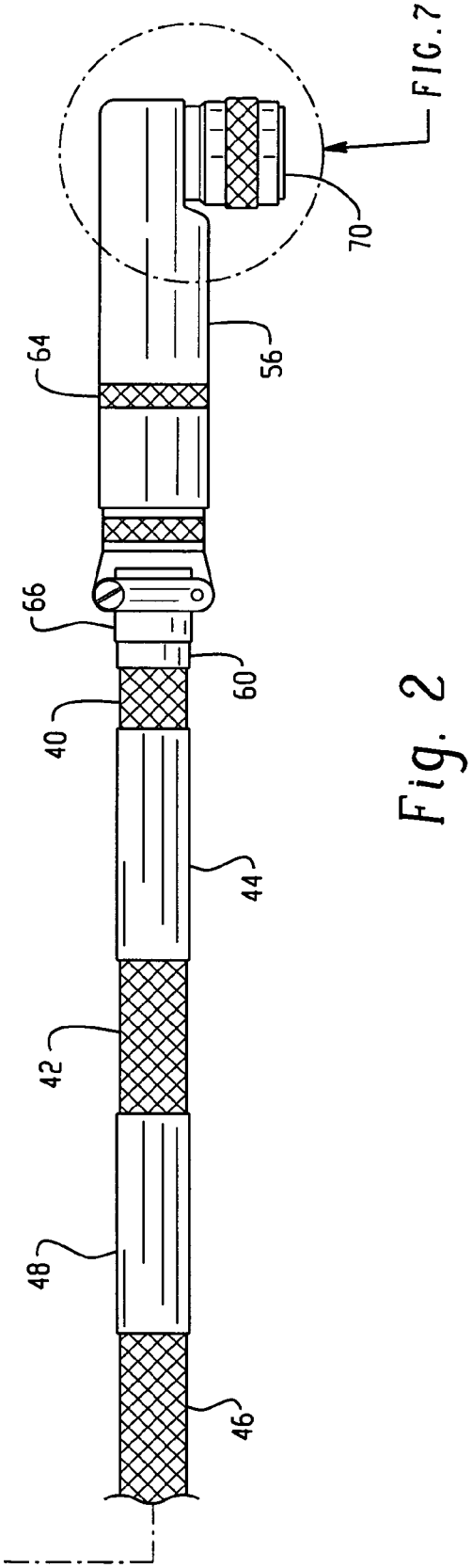

A wiring configuration for the safe side wiring 24 of a protective barrier suitable for embodying the broad principles of the present invention is shown in the illustration of FIG. 2. Referring to FIG. 2, the safe side wiring 24 may comprise a core bundle of wires, like the low impedance wires 16a and 16b and shielded, high impedance wire 16c, for example, completely enclosed along the entire length thereof by one or more shield layers 30, preferably braided metallic shields, which is (are) capable of conducting the fault energy. This safe side wiring 24 should be made as short as possible and passed between the circuitry of the barrier 18 and circuitry within the tank 14 in such a manner so as not to physically come in contact with other cabling 34, such as wiring, cables, hydraulic lines and the like, for example. As shown in the illustration of FIG. 3, positive separation may be ensured by the use of double P-type clamps 32 spaced along the bundle 24 such that a single clamp failure will not permit adjacent cabling 34 to come in contact with the protected bundle 24. This separation may be achieved by a spacing 36 of the P-type clamps every two inches or so, for example, along the length of the bundle 24. Preferably, spacing 38 between the bundle 24 and the other cabling 34 should be at a minimum of approximately 0.5 inches all along the length of the bundle 24 to prevent the formation of arcing due to lightning or other high voltage fault conditions.

While the core bundle of wires 24 is being described for the present embodiment as having the three wires 16a, 16b and 16c, it is understood that it may be comprised of any wiring that will pass from an output connector (not shown) of the barrier 18 to a penetration connector (not shown) at the tank wall which couples the wires to the circuitry of sensor components inside the fuel tank 14. In some applications, a single shield layer 30 may not be sufficient to protect the core bundle of wires 24 from a particular high level threat. In these cases, a second or even third metal over-braid shield layer may be desirable. In any event, the one or more metallic braided shields 30 surrounding the safe side wire bundle 24 is preferably of sufficient physical size so that the maximum expected fault current times the total shield resistance is less than approximately one volt RMS.

If more than one layer of over-braid shield is used, then the shield layers are separated from one another along the length of the bundle 24 by electrical and thermal insulating layers. For example, an inside shield layer 40 is separated from an intermediate shield layer 42 by an insulating layer 44. Likewise, the intermediate layer 42 is separated from a top shield layer 46 by an insulating layer 48. If a label is desired for designating the wire bundle, it may be affixed to an outside insulating layer 50 sized to a length dimension 52 to accommodate the label.

In the present embodiment, the one or more shields 30 of the bundle 24 are terminated at each end into the housing of connectors 54 and 56 which may be EMI back shell connectors, for example. The housing of each connector 54 and 56 is capable of conducting the fault energy from the shield layers 30. Termination connection is achieved in each housing of back shell connector 54 and 56 using a 360° (around the circumference of the bundle 24) termination technique utilizing ferrules 58 and 60, respectively. The length of the insulating layers 44 and 48 end a short distance before each end termination point so that the shield layers may make physical and electrical contact with each other at each point of termination. For termination, the one or more shield layers are inserted well within each back shell 54 and 56, preferably to the point 64. In the back shell connector 54, a screw down clamp 62 is provided to compress the ferrule 58 around the one or more shield layers to form a sound compression connection of the one or more layers to each other and to the metallic body of the back shell 54. Likewise, in the back shell connector 56, a screw down clamp 66 is provided to compress the ferrule 60 around the one or more shield layers to form a sound compression connection of the one or more layers to each other and to the metallic body of the back shell 56. In this manner, shield conductivity is maintained from the over-braid layers 30 to the surfaces of the mating connector portions 68 and 70 of the back shells 54 and 56, respectively. Thus, when the connector portions 68 and 70 are mated to their respective connectors at the barrier 18 and tank 14, shielding is contiguous through the housing of the barrier 18, the wire bundle 24 and the wall of the fuel tank 14 for conducting fault energy along each contiguous path.

Figure 4:
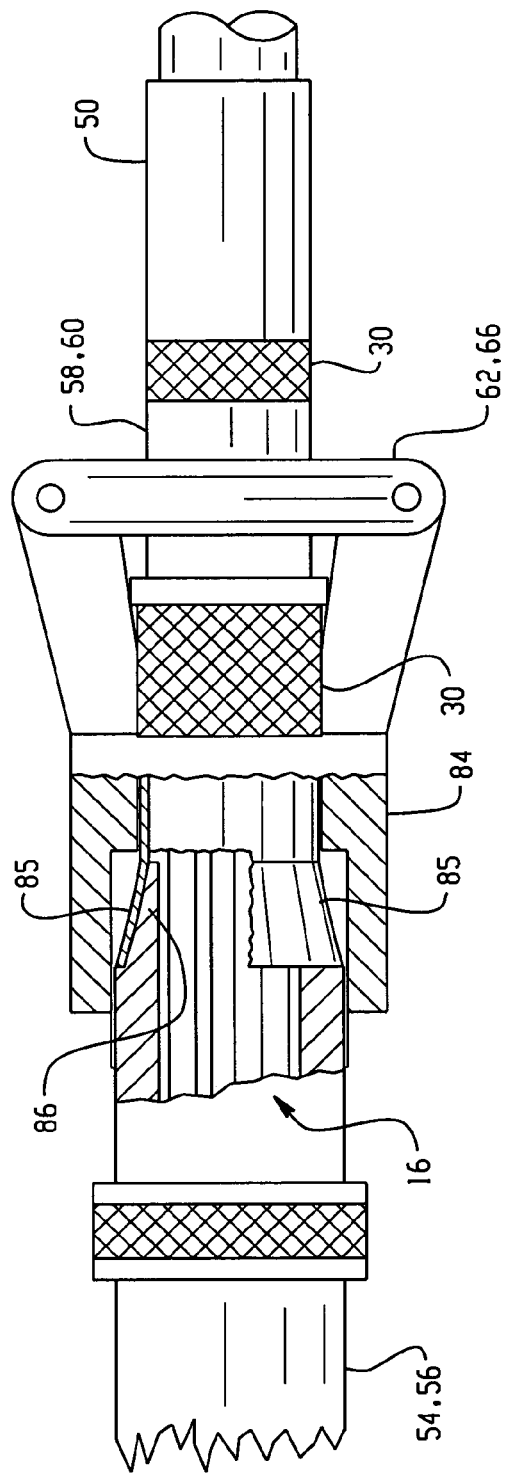
FIG. 4 is a cross-section, cut-away illustration of a portion of a connector suitable for use in the embodiment of FIG. 2 for providing shield termination of the safe side wiring.

The shield termination of the wire bundle 24 to the back shell connector 54, 56 is shown in greater detail in FIG. 4. Referring to FIG. 4, the one or more metal over-braid shield layers 30 are disposed through the ferrule 58, 60 and into a back potion 84 of the respective clamp 62, 66. Thereafter, the one or more shield layers 30 are passed between an outer cone section 85 and an inner cone section 86 of the respective back shell 54, 56. Accordingly, as the back portion 84 of the clamp 62, 66 is forced over the back shell 54, 56, the outer cone section 85 is compressed against the inner cone section 86 to provide for a good connection between the shield layer(s) 30 and the back shell 54, 56, thus extending the shielding 30 to the back shell 54, 56. In addition, as the clamp 62, 66 is screwed down, it compresses the ferrule 58, 60 and clamps the wire cable in place, thus providing tension relief on the wires 16 which are passed internally through the back shell 54, 56 to the respective connector portion 68, 70.

Figure 5:
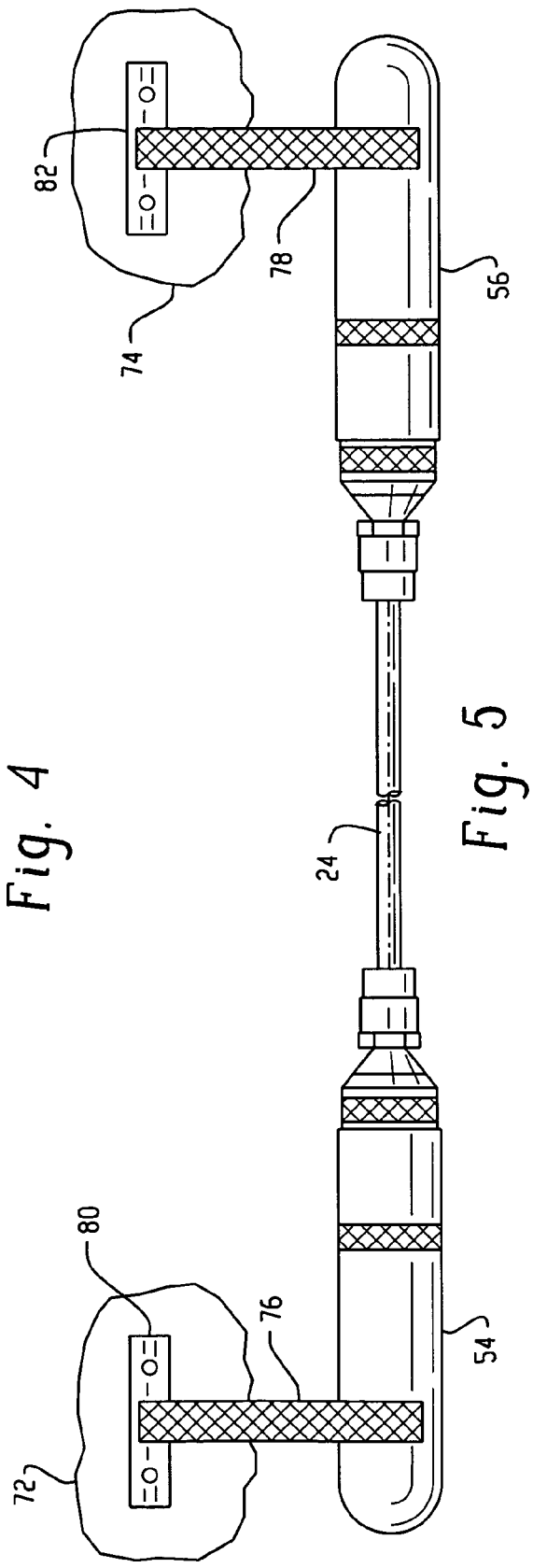
FIG. 5 is a top view illustration of the embodiment of FIG. 2 showing the shielding of the safe side wiring being bonded to metallic structures via connectors at both ends thereof.

Moreover, each end of the shielding is bonded to a metallic structure like a frame section of the aircraft via the respective housing of the back shells 54 and 56 as illustrated by a top view of the embodiment shown in FIG. 5. Accordingly, fault energy may be conducted from each connector housing to the respective metallic structure which is capable of dissipating the fault energy. In the present embodiment, the housings of the back shells 54 and 56 are electrically and thermally coupled to sections 72 and 74 of the airframe via pigtails 76 and 78, respectively. Each pigtail 76 and 78 preferably has a length to width ratio of no more than approximately five to one and a length less than approximately six inches. In the present example, the housings of the back shells 54 and 56 have flat top surfaces to which may be bonded, preferably by soldering, one end of the respective pigtails 76 and 78. If the particular back shell used is cylindrical, the pigtail may be soldered around the circumference of the back shell at each end of the bundle 24. The other end of each pigtail 76 and 78 is bonded, by soldering, welding, or similar bonding technique, to a respective metallic plate 80 and 82. In turn, each metallic plate 80 and 82 is bonded respectively to the sections 72 and 74 of the airframe. To ensure a sound metal to metal contact which provides a solid electrical and thermal conductive path between the shield of the bundle 24 and the airframe, each plate 80 and 82 may be bonded to its airframe section using a faying surface bond.

A suitable faying surface bond technique includes polishing the surfaces of the plate and mating airframe surfaces, preferably using an abrasive technique, and then, cleaning the surfaces with a solvent such as isopropyl alcohol, for example. The resulting surfaces of the plate and airframe section should be clean and smooth. If one or both surfaces are aluminum, an appropriate conductive protective coating, such as alodine, for example, may be applied to the mating surfaces. Thereafter, the treated surfaces of the plate and airframe section may be joined and riveted together, and the joint edges of the mating surfaces may be sealed using an appropriate environmental sealant.

Figure 6:
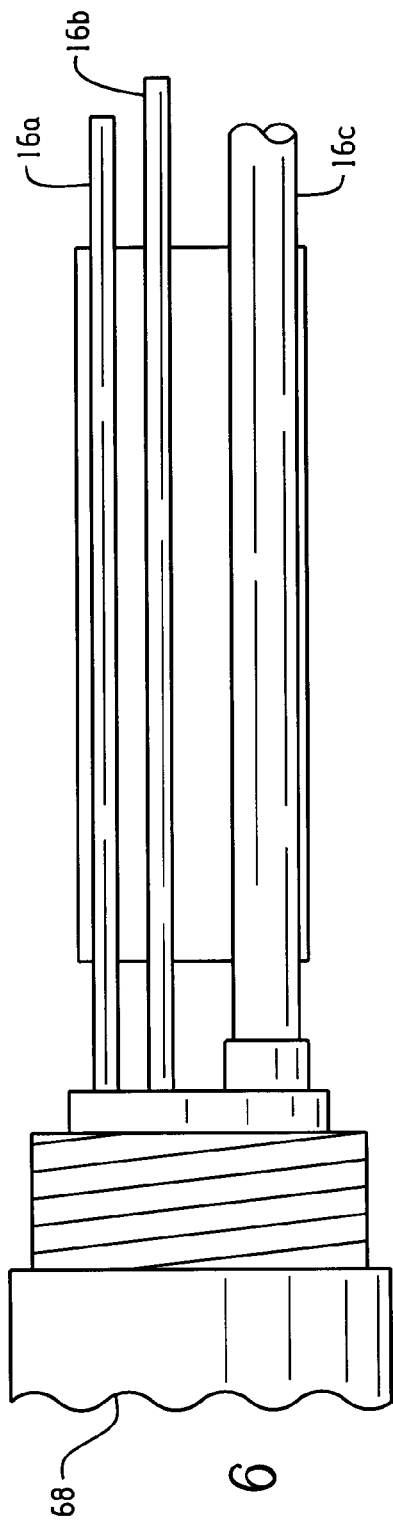
FIG. 6 is a cut-away illustration of a portion of an exemplary connector suitable for use in the embodiment of FIG. 2.
Figure 7:
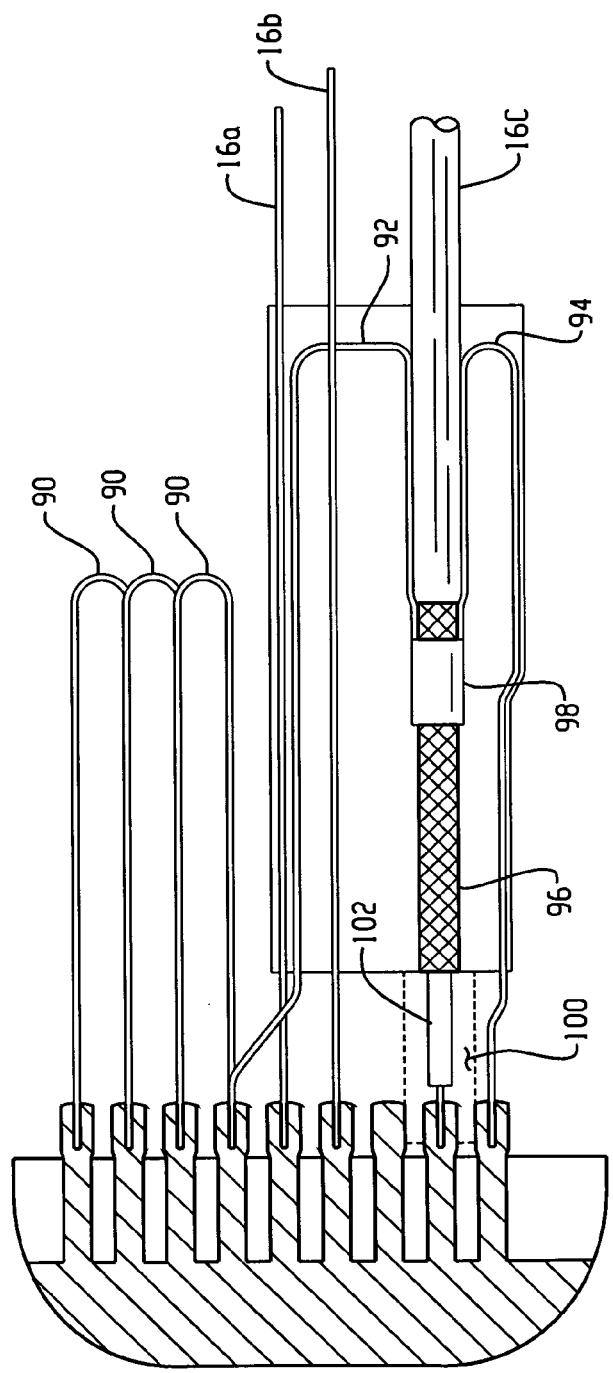
FIG. 7 is a cut-away illustration of a portion of another exemplary connector suitable for use in the embodiment of FIG. 2.

Referring back to FIG. 2, as noted above, the wires 16 of the core bundle 24 are passed through the housing of each back shell connector 54 and 56 to make connection with corresponding pin contacts of the connector portions 68 and 70, respectively. An exemplary connector portion 68 is shown in greater detail in the illustration of FIG. 6. Referring to FIG. 6, each of the wires 16a, 16b and 16c are shown coupled to corresponding pin contacts of the connector portion 68 of the back shell connector assembly 54 which may be of the type manufactured by Cinch Co. under the part no. CN1020A14G035SN-040, for example. Similarly, an exemplary connector portion 70 is shown in greater detail in the illustration of FIG. 7. Referring to FIG. 7, each of the wires 16a, 16b and 16c are shown coupled to corresponding pin contacts of the connector portion 70 of the back shell connector assembly 56 which may be of the type manufactured by Cinch Co. under the part no. M83723/43R1419X, for example. Note that in the connector portion 70, certain of the pin contacts are shorted together with wires 90, 92 and 94. Wires 92 and 94 are coupled to the over-braid shielding 96 of the wire 16c, preferably with a soldering sleeve 98. In the dashed line area 100, the over-braiding 96 is stripped from the wire 16c exposing the insulation layer 102. In all three wires 16a, 16b and 16c, just before each wire is inserted into its corresponding pin contact, the insulation is stripped from the wire to permit a metal to metal conduction path.

Accordingly, the effect of the foregoing safe side wiring configuration embodiment is to extend the protection afforded by the housing of the barrier 18 through the safe side core wiring bundle to the tank penetration connector and wall of the fuel tank. In essence. Once the protective barrier 18 has limited the fault energy present on the wiring, the safe side wiring never leaves the protection of the protective barrier. That is, the safe side wiring becomes an extension of the protective barrier shielding.

Although the present invention has been described herein above in connection with a protective energy barrier for use in an aircraft fuel quantity measuring system, it is understood that the principles of the present invention in their broader aspects may be adapted to non-aircraft fuel tank applications and still other applications where a protective energy barrier may be useful in limiting the transfer of energy via wiring into an explosive or other environment. The present invention contemplates such other applications. In addition, while the present invention has been described above in connection with one or more embodiments, it is further understood that these embodiments were presented merely by way of example with no intent of limiting the present invention in any way, shape or form by such presentation. Rather, the present invention should be construed in breadth and broad scope in accordance with the recitation of the claims appended hereto.

What is claimed is:

1. Method of protecting safe side wiring of a protective energy barrier against transferring fault energy into a potentially explosive environment, said method comprising the steps of:

enclosing the safe side wiring with at least one layer of shielding completely along the length thereof, said at least one layer of shielding capable of conducting the fault energy;

connecting the safe side wiring at one end to circuitry of the protective energy barrier through a first connector having a housing which completely surrounds the safe side wiring prior to entering the protective energy barrier and is capable of conducting the fault energy;

connecting said at least one layer of shielding of the safe side wiring to the housing of the first connector to conduct fault energy therebetween;

connecting the safe side wiring at another end to circuitry within the potentially explosive environment through a second connector having a housing which completely surrounds the safe side wiring prior to entering the potentially explosive environment and is capable of conducting the fault energy;

connecting said at least one layer of shielding of the safe side wiring to the housing of the second connector to conduct fault energy therebetween; and connecting the housings of the first and second connectors to structures capable of dissipating the fault energy.

2. The method of claim 1 wherein the safe side wiring is enclosed with at least one layer of metal over-braid shielding.

3. The method of claim 1 wherein the housing of the first connector is connected to the structure through a pigtail metal braid.

4. The method of claim 3 including the steps of: connecting the pigtail metal braid at one end to the housing of the first connector; and connecting the pigtail metal braid at another end to the structure through a metal plate.

5. The method of claim 4 including the step of treating connecting surfaces of the metal plate and structure by a faying surface bond technique.

6. The method of claim 1 wherein the housing of the second connector is connected to the structure through a pigtail metal braid.

7. The method of claim 6 including the steps of: connecting the pigtail metal braid at one end to the housing of the second connector; and connecting the pigtail metal braid at another end to the structure through a metal plate.

8. The method of claim 7 including the step of treating connecting surfaces of the metal plate and structure by a faying surface bond technique.

9. The method of claim 1 including maintaining a predetermined minimum separation of the safe side wiring from other cabling along the length thereof.

10. The method of claim 9 wherein the step of maintaining includes disposing separation clamps along the length of the safe side wiring at predetermined spacings.

11. The method of claim 1 wherein the at least one layer of shielding is connected to the housing of the first connector completely along the 360° circumference of the at least one layer of shielding.

12. The method of claim 1 wherein the at least one layer of shielding is connected to the housing of the second connector completely along the 360° circumference of the at least one layer of shielding.

13. Apparatus for protecting safe side wiring of a protective energy barrier against transferring fault energy into a potentially explosive environment, said apparatus comprising:

at least one layer of shielding enclosing the safe side wiring completely along the length thereof, said at least one layer of shielding capable of conducting the fault energy;

a first connector for connecting the safe side wiring at one end to circuitry of the protective energy barrier, said first connector having a housing which completely surrounds the safe side wiring prior to entering the protective energy barrier and is capable of conducting the fault energy, said at least one layer of shielding being connected to the housing of the first connector for conducting fault energy therebetween;

a first connection assembly for connecting the housing of the first connector to a first structure to conduct fault energy therebetween;

a second connector for connecting the safe side wiring at another end to circuitry within the potentially explosive environment, said second connector having a housing which completely surrounds the safe side wiring prior to entering the potentially explosive environment and is capable of conducting the fault energy, said at least one layer of shielding being connected to the housing of the second connector for conducting fault energy therebetween; and a second connection assembly for connecting the housing of the second connector to a second structure to conduct fault energy therebetween.

14. The apparatus of claim 13 wherein the first and second structures are both capable of dissipating the fault energy.

15. The apparatus of claim 13 wherein the first and second connectors each comprise a back shell connector.

16. The apparatus of claim 15 wherein the first and second connectors each comprises a clamping device for securing the connection between the at least one layer of shielding to the housing of the respective back shell connector.

17. The apparatus of claim 13 wherein the at least one layer of shielding comprises metal over-braid shielding.

18. The apparatus of claim 13 wherein the first and second connection assemblies each comprises: a pigtail metal braid; and a metal plate connected to one end of the pigtail braid, another end of the pigtail braid being connected to the housing of the respective first and second connector, said metal plate being connectable to the respective first and second structure.

19. The apparatus of claim 18 wherein the pigtail metal braid has a length to width ratio that does not exceed five.

20. The apparatus of claim 13 including spacing clamps disposed along the length of the safe side wiring to maintain a predetermined minimum separation between the safe side wiring and other cabling.

21. The apparatus of claim 20 wherein the spacing clamps are disposed along the length of the safe side wiring at predetermined spacings.

22. The apparatus of claim 13 wherein the potentially explosive environment comprises a fuel tank.

23. The apparatus of claim 22 wherein the fuel tank is disposed on an aircraft, and the first and second structures comprise sections of the frame of the aircraft.

24. The apparatus of claim 13 wherein the at least one layer of shielding is connected to the housing of the first connector completely along the 360° circumference of the at least one layer of shielding.

25. The apparatus of claim 13 wherein the at least one layer of shielding is connected to the housing of the second connector completely along the 360° circumference of the at least one layer of shielding.

* * * * *